(12) United States Patent
Lambert et al.

(10) Patent No.: US 12,115,727 B2
(45) Date of Patent: Oct. 15, 2024

(54) ADDITIVE MANUFACTURING METHODS AND SYSTEMS INCLUDING A ROTATOR ASSEMBLY FOR MANIPULATING A BUILD ASSEMBLY

(71) Applicant: General Electric Company, Schenectady, NY (US)

(72) Inventors: Eric Olen Lambert, Central, SC (US); Archie L. Swanner, Jr., Easley, SC (US); James J. Murray, Mauldin, SC (US); Maxwell E. Miller, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/851,379

(22) Filed: Jun. 28, 2022

(65) Prior Publication Data

US 2023/0415411 A1    Dec. 28, 2023

(51) Int. Cl.
*B29C 64/241*    (2017.01)
*B29C 64/153*    (2017.01)
(Continued)

(52) U.S. Cl.
CPC .......... *B29C 64/241* (2017.08); *B29C 64/153* (2017.08); *B29C 64/245* (2017.08);
(Continued)

(58) Field of Classification Search
CPC ... B29C 64/241; B29C 64/153; B29C 64/245; B29C 64/357; B33Y 10/00; B33Y 30/00; B33Y 40/00
See application file for complete search history.

(56) References Cited

U.S. PATENT DOCUMENTS

| 10,011,469 B2 | 7/2018 | Craft et al. |
| 10,189,057 B2 | 1/2019 | Craft et al. |

(Continued)

FOREIGN PATENT DOCUMENTS

| CN | 107160677 A | * | 9/2017 | ............. B33Y 10/00 |
| CN | 108746515 A | * | 11/2018 | ............. B22C 25/00 |
| DE | 202016003042 U1 | | 7/2016 | |

OTHER PUBLICATIONS

CN 107160677 translation (Year: 2023).*
CN-108746515-A translation (Year: 2023).*

*Primary Examiner* — Jeffrey M Wollschlager
*Assistant Examiner* — Guy F Mongelli
(74) *Attorney, Agent, or Firm* — Armstrong Teasdale LLP

(57) ABSTRACT

An additive manufacturing system includes an additive manufacturing unit that includes a housing for additively processing a powder material along a build direction into a build assembly. The additive manufacturing system further includes a rotator assembly for rotating the build assembly within the housing. The rotator assembly includes a frame including a first frame arm and a second frame arm and a carriage rotatably coupled to the first frame arm and to the second frame arm. The carriage includes at least one coupling mechanism for removably coupling the carriage to the build assembly. The rotator assembly further includes a drive assembly coupled to the carriage for selectively rotating the carriage about a rotational axis that is generally perpendicular to the build direction.

20 Claims, 13 Drawing Sheets

(51) Int. Cl.
  *B29C 64/245* (2017.01)
  *B29C 64/357* (2017.01)
  *B33Y 10/00* (2015.01)
  *B33Y 30/00* (2015.01)
  *B33Y 40/00* (2020.01)

(52) U.S. Cl.
  CPC ............ *B29C 64/357* (2017.08); *B33Y 10/00* (2014.12); *B33Y 30/00* (2014.12); *B33Y 40/00* (2014.12)

(56) References Cited

U.S. PATENT DOCUMENTS

| | | | | |
|---|---|---|---|---|
| 2005/0195517 A1* | 9/2005 | Brace | ................ | G11B 15/6835 |
| | | | | 360/92.1 |
| 2012/0161350 A1* | 6/2012 | Swanson | ............... | B29C 64/106 |
| | | | | 264/40.7 |
| 2013/0078073 A1* | 3/2013 | Comb | .................... | B33Y 40/00 |
| | | | | 414/800 |
| 2013/0189435 A1* | 7/2013 | Mackie | .................. | B33Y 30/00 |
| | | | | 427/256 |
| 2014/0191439 A1* | 7/2014 | Davis | .................... | B29C 64/245 |
| | | | | 425/375 |
| 2016/0318248 A1* | 11/2016 | Susnjara | .................. | B29C 48/02 |
| 2018/0369918 A1* | 12/2018 | Gold | ...................... | B22F 10/50 |
| 2019/0178755 A1* | 6/2019 | Lee | ........................ | B33Y 30/00 |
| 2019/0344346 A1* | 11/2019 | Tucker | .................. | B05C 11/045 |
| 2020/0016838 A1 | 1/2020 | McMurtry et al. | | |
| 2020/0290276 A1* | 9/2020 | Kunc | ...................... | B33Y 10/00 |
| 2020/0346407 A1* | 11/2020 | Goodwin | .............. | B29C 64/153 |
| 2021/0138554 A1* | 5/2021 | Zeilinger | .............. | B22F 10/322 |
| 2021/0187855 A1* | 6/2021 | Cardon | .................. | B22F 10/18 |
| 2023/0049328 A1* | 2/2023 | Kalaiselvan | .............. | B25B 5/12 |

* cited by examiner

# ADDITIVE MANUFACTURING METHODS AND SYSTEMS INCLUDING A ROTATOR ASSEMBLY FOR MANIPULATING A BUILD ASSEMBLY

BACKGROUND

The present disclosure relates generally to additive manufacturing systems and, more particularly, to additive manufacturing systems that include a manipulator assembly for manipulating an additive build assembly.

Additive manufacturing systems are essential to the production of many modern specialized components. Such systems may incorporate a build material, such as a metal powder, to successively build layers of a build component on a build plate. As the component is being additively formed in successive layers, specific cavities or openings that are a part of the components design may be formed in the build component. After a build cycle, depending on the location and size of the cavities, at least some of the powder material may be undesirably trapped within the cavities and may be difficult to remove. Thus, at least some known manufacturing systems insert tubing through portions of a component to supply either positive or negative air pressure in an attempt to remove the material from those portions. However, material trapped within small or even microscopically small cavities defined within an airfoil, may be difficult to access with the tubing and thus may be difficult to remove. As a result, within at least some known manufacturing systems, often auxiliary accessories may be needed to remove the material from such smaller cavities. However, such a process may be costly and such equipment may not capture the excess material, thus leading to additional waste and manufacturing costs. Accordingly, it would be desirable to find a cost-effective method to remove material from smaller cavities.

BRIEF DESCRIPTION

In one aspect, an additive manufacturing system is provided. The additive manufacturing system includes an additive manufacturing unit that includes a housing for additively processing a powder material along a build direction into a build assembly. The additive manufacturing system further includes a rotator assembly for rotating the build assembly within the housing. The rotator assembly includes a frame including a first frame arm and a second frame arm and a carriage rotatably coupled to the first frame arm and to the second frame arm. The carriage includes at least one coupling mechanism for removably coupling the carriage to the build assembly. The rotator assembly further includes a drive assembly coupled to the carriage for selectively rotating the carriage about a rotational axis that is generally perpendicular to the build direction.

In another aspect, a rotator assembly for rotating a build assembly within an additive manufacturing unit is provided. The build assembly is at least partially additively manufactured by processing a powder material along a build direction. The rotator assembly includes a frame having a first frame arm and a second frame arm and a carriage rotatably coupled to the first frame arm and the second frame arm. The carriage includes at least one coupling feature for coupling the carriage to the build assembly. The rotator assembly further includes a drive assembly operably coupled to the carriage for rotating the carriage about a rotational axis that is generally perpendicular to the build direction.

In yet another aspect, a method of rotating a build assembly within a housing of an additive manufacturing unit is provided. The additive manufacturing unit is configured to additively form the build assembly by processing a powder material along a build direction. The method includes rotatably coupling a carriage to a frame of a rotator assembly, the frame including a first frame arm and a second frame arm. The method further includes coupling the carriage to the build assembly and rotating, by a drive assembly operably coupled to the carriage, the carriage and build assembly about a rotational axis that is generally perpendicular to the build direction.

DRAWINGS

These and other features, aspects, and advantages of the present disclosure will become better understood when the following detailed description is read with reference to the accompanying drawings in which like characters represent like parts throughout the drawings, wherein.

Figure 1:
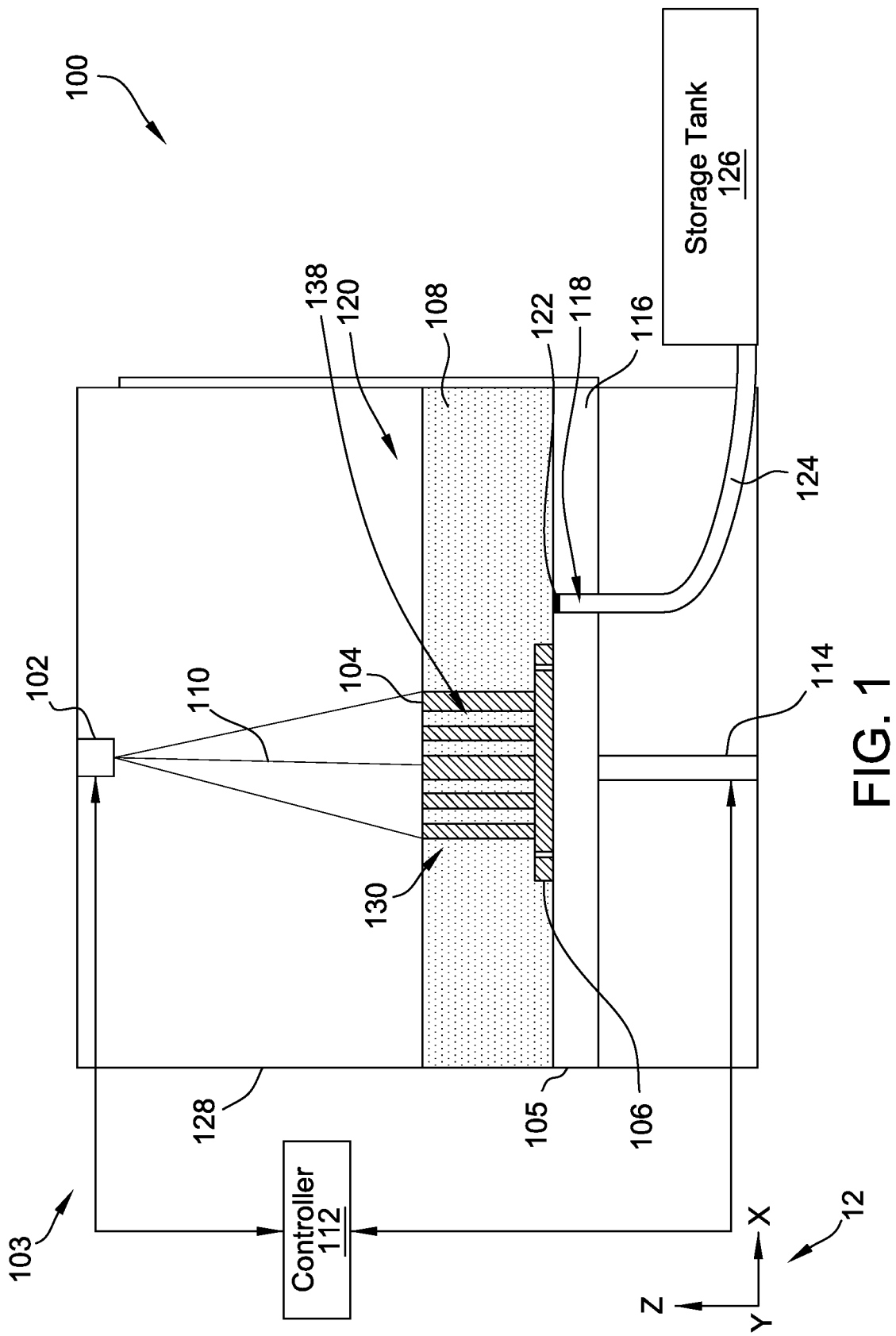
FIG. 1 is a schematic view of an exemplary additive manufacturing unit.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the example embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

As used herein, the term "build cycle" refers to one cycle of an additive manufacturing process beginning with depositing powder in a powder bed and ending with removing the completed component from the powder bed.

As used herein, the term "powder" refers to any material capable of constituting the base material in an additive manufacturing system from which the finished component is formed. This may include, but is not limited to, polymers, plastics, metals, ceramics, sand, glass, waxes, fibers, biological matter, composites, and hybrids of these materials. Furthermore, use of the term "powder" should not be interpreted as limiting the consistency of the material beyond referring to the fact that the material is capable of being consolidated by a consolidation device and of substantially filling a volume between a structure and component.

The systems and methods described herein include systems and methods for manipulating or rotating a build assembly within an additive manufacturing unit. The additive manufacturing unit includes a housing for additively processing a powder material along a build direction into a build assembly. The systems also include a rotator assembly that includes a frame including a first frame arm and a second frame arm. The rotator assembly further includes a carriage rotatably coupled to the frame arms that includes at least one coupling feature for coupling the carriage to the build assembly. The carriage further includes a drive assembly operably coupled to the carriage for rotating the carriage about a rotational axis that is parallel to the build direction.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, Direct Metal Laser Melting, DMLM, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary additive manufacturing system 100. A coordinate system 12 includes an X-axis, a Y-axis, and a Z-axis. Additive manufacturing system 100 includes an additive manufacturing unit 103 that includes an additive housing 105 and a consolidating device 102 within housing 105 for fabricating a component 104 on a build plate 106 (collectively referred to herein as a "build assembly" 130) from a powder material 108 using a layer-by-layer additive manufacturing process. In the exemplary embodiment, consolidating device 102 includes a laser device, a scanning motor, a scanning mirror, and a scanning lens (none of which are shown). Alternatively, consolidating device 102 may include any other apparatus that facilitates consolidation of a material using any of the processes and systems described herein. In the exemplary embodiment, additive manufacturing system 100 is configured for Direct Metal Laser Melting, though in other embodiments, additive manufacturing system 100 may be configured for any other additive manufacturing process, such as, for example, the above-referenced additive manufacturing processes.

Consolidating device 102 provides a high-intensity heat source configured to generate a melt pool in the powdered material 108 using an energy beam 110. Additive manufacturing system 100 also includes a computer control system, or controller 112. Consolidating device 102 is selectively moved by an actuator (not shown) that moves consolidating device 102 in an X-Y plane to facilitate fabricating a layer of component 104 within additive manufacturing system 100. Alternatively, consolidating device 102 and energy beam 110 may be moved in any orientation and manner that enables additive manufacturing system 100 to function as described herein.

In the exemplary embodiment, additive manufacturing unit 103 includes a build platform 116 that is moved by actuator 114. Actuator 114 is in communication with, and moved by, controller 112. Actuator 114 moves build platform 116 in a Z-direction, also referred to herein as a "build direction" (i.e., normal to an upper surface of build platform 116). In the exemplary embodiment, actuator 114 includes, for example, and without limitation, a linear motor(s), a hydraulic and/or pneumatic piston(s), a screw drive mechanism(s), and/or a conveyor system.

Figure 5:
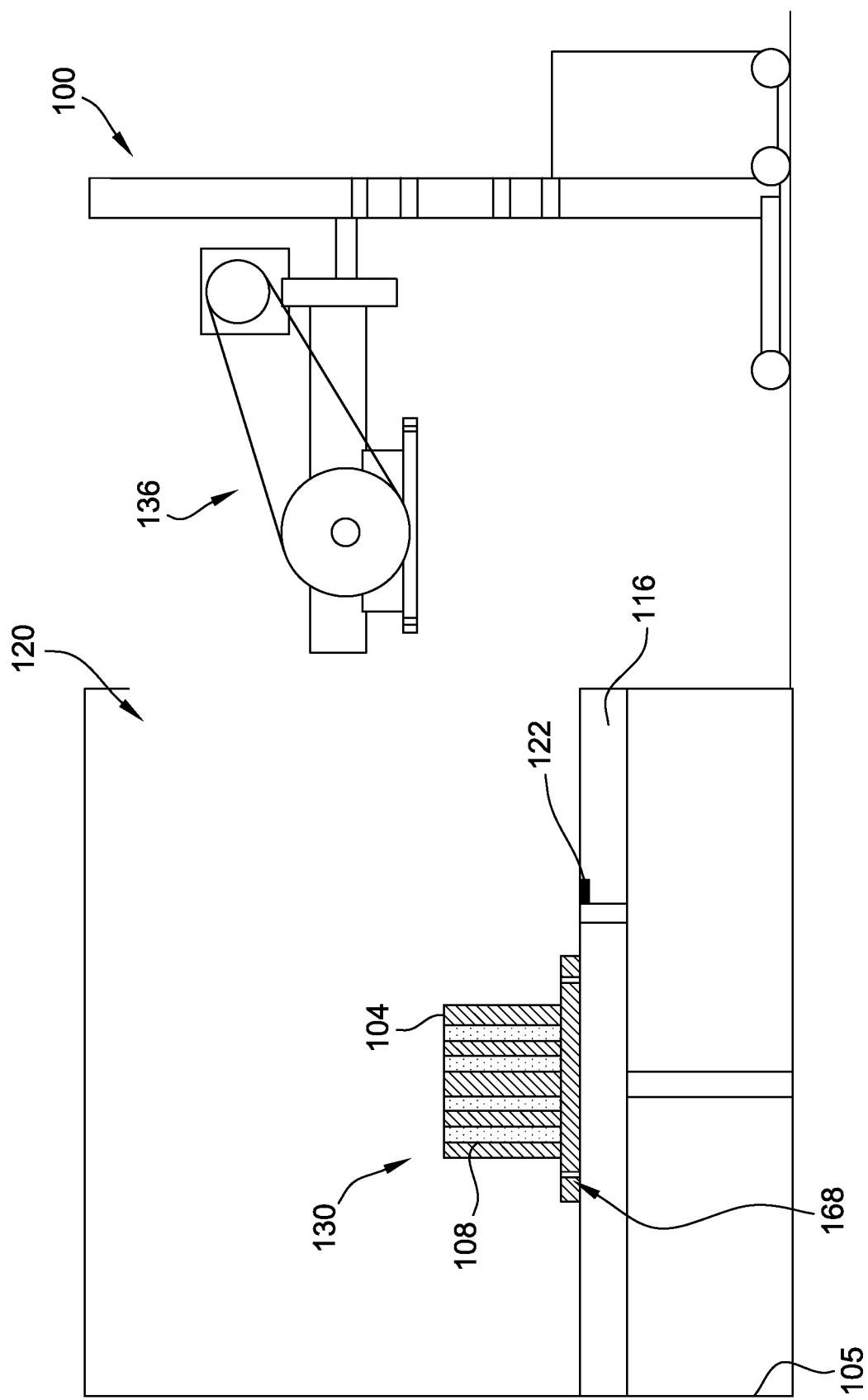
FIG. 5 is another schematic view of the additive manufacturing system shown in FIG. 3, showing a second subsequent step in the exemplary manufacturing process.

In the exemplary embodiment, additive manufacturing unit 103 includes a powder drain 118 for removing powder material 108 from a build area 120 defined within additive housing 105 (e.g., on build platform 116 in the example embodiment) after fabrication is completed. Powder drain 118 includes a valve 122 that is closed during fabrication, as shown in FIG. 1, and that may be selectively opened after fabrication (e.g., as shown in FIG. 5) to facilitate removing powder material 108 from build area 120. Tubing 124 enables powder material 108 to be stored and/or supplied from a storage tank 126. Storage tank 126 retains the unused powder material 108 collected from powder drain 118 for reuse in subsequent build cycles. A vacuum generator (not shown) may be fluidly coupled with tubing 124 to create a negative pressure within build area 120 to enable powder material 108 to be drawn into powder drain 118 and storage tank 126. In the illustrated example, powder drain 118 is defined within build platform 116. In other embodiments, powder drain 118 may be provided at any other suitable position within build area 120. For example, and without limitation, in some embodiments, powder drain 118 is defined within a sidewall 128 of additive housing 105. In further embodiments, additive manufacturing unit 103 includes a plurality of powder drains 118.

In the exemplary embodiment, additive manufacturing unit 103 is fabricates component 104 on build plate 106 by additively processing powder material 108 along the Z direction or "build direction" into a build assembly 130. Build plate 106 is positioned within additive housing 105 on build platform 116 prior to the initiation of fabrication. During fabrication, component 104 is fabricated on and welded with build plate 106. When coupled securely together, build plate 106 and component 104 are collectively referred to herein as a build assembly 130. After fabrication of component 104, in the exemplary embodiment, component 104 is separated from build plate 106 by cutting component 104 from build plate 106. Build plate 106 is then smoothed and may be reused in subsequent build cycles. Component 104 may include a single unitary component or a plurality of individual components that are separated after fabrication. In the exemplary embodiment, component 104 includes a plurality of airfoils for use in a gas-powered turbine. In other embodiments, component 104 may include any other suitable additively manufactured component 104.

In the illustrative example, additive manufacturing system 100 fabricates component 104 from a computer-modeled representation of the 3-D geometry of component 104. The computer-modeled representation may be produced in a computer aided design (CAD) or similar file. The CAD file of component 104 is converted into a layer-by-layer format that includes a plurality of build parameters that defined each layer, including a build layer, of component 104, for example. In the exemplary embodiment, component 104 is modeled in a desired orientation relative to the origin of the coordinate system used in additive manufacturing system 100. The geometry of component 104 is sliced into a stack of layers that each have a desired thickness, such that the geometry of each layer represents an outline of the cross-sectional profile of component 104 at a specific relative layer location. Scan paths are generated across the geometry of a respective layer. The build parameters are applied along the scan path to fabricate that layer of component 104 from the powder material 108. The steps are repeated for each respective layer of component 104 geometry. Once the process is completed, an electronic computer build file (or files) or scan path data set is generated, that includes all of the plurality of layers generated. The build file or scan path data set is programmed into controller 112 of additive manufacturing system 100 to enable control of the system during fabrication of each layer.

After the build file or scan path data set is stored in controller 112, additive manufacturing system 100 can generate component 104 by implementing the layer-by-layer manufacturing process, such as a selective laser melting method. The example layer-by-layer additive manufacturing process does not use a pre-existing article as the precursor to the final component, rather the component 104 is produced from a raw material in a configurable form, such as a powder material 108. For example, and without limitation, a steel component can be additively manufactured using a steel powder. Additive manufacturing system 100 can fabricate a plurality of different components, such as component 104, using a broad range of materials, for example, and without limitation, metals, ceramics, glass, and polymers.

Figure 2:
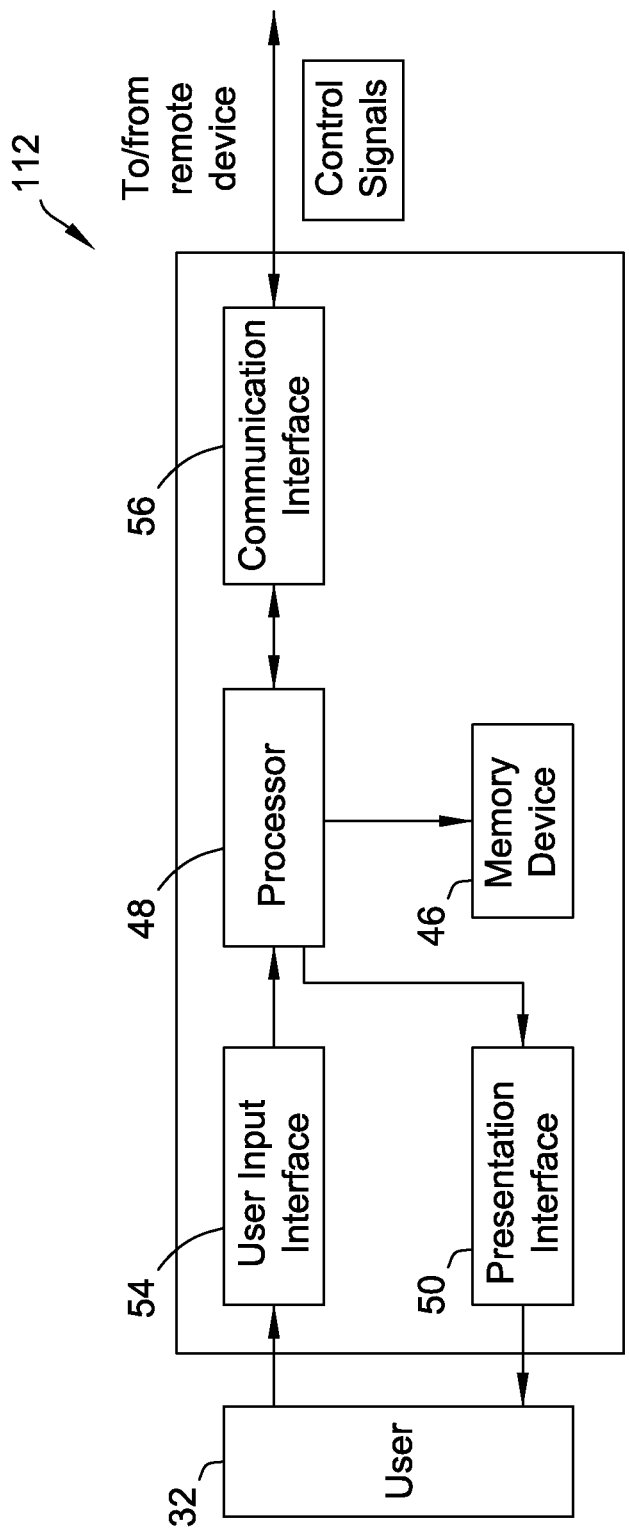
FIG. 2 is a block diagram of an exemplary controller that may be used to operate the additive manufacturing unit shown in FIG. 1.

FIG. 2 is a block diagram of an exemplary controller 112 that may be used to operate additive manufacturing system 100 (shown in FIG. 1). In the exemplary embodiment, controller 112 is any type of controller typically provided by a manufacturer of additive manufacturing system 100 to control operation of additive manufacturing system 100. In each embodiment, controller 112 executes operations to control the operation of additive manufacturing system 100 based at least partially on instructions from human operators. In alternative embodiments, controller 112 automatically executes operations to control the operation of additive manufacturing system 100. Controller 112 includes, for example, a 3-D model of component 104 to be fabricated by additive manufacturing system 100. Operations executed by controller 112 include, but are not limited to only including, controlling power output of consolidating device 102 (shown in FIG. 1) and controlling the scanning velocity of energy beam 110. In alternative embodiments, controller 112 may execute any other operation that enables additive manufacturing system 100 to function as described herein.

In the example embodiment, controller 112 includes a memory device 46 and a processor 48 coupled to memory device 46. Processor 48 may include one or more processing units, such as, without limitation, a multi-core configuration. Processor 48 is any type of processor that permits controller 112 to operate as described herein. In some embodiments, executable instructions are stored in memory device 46. Controller 112 is configurable to perform one or more operations described herein by programming processor 48. For example, processor 48 may be programmed by encoding an operation as one or more executable instructions and providing the executable instructions in memory device 46. In the example embodiment, memory device 46 is one or more devices that enable storage and retrieval of information such as executable instructions or other data. Memory device 46 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are example only, and are thus not limiting as to the types of memory usable for storage of a computer program.

Memory device 46 may be configured to store any type of data, including, without limitation, build parameters associated with component 104. In some embodiments, processor 48 removes or "purges" data from memory device 46 based on the age of the data. For example, processor 48 may overwrite previously recorded and stored data associated with a subsequent time or event. In addition, or alternatively, processor 48 may remove data that exceeds a predetermined time interval. In addition, memory device 46 includes, without limitation, sufficient data, algorithms, and commands to facilitate monitoring of build parameters and the geometric conditions of component 104 being fabricated by additive manufacturing system 10.

In some embodiments, controller 112 includes a presentation interface 50 coupled to processor 48. Presentation interface 50 presents information, such as the operating conditions of additive manufacturing system 10, to a user 52. In one embodiment, presentation interface 50 includes a display adapter (not shown) coupled to a display device (not shown), such as a cathode ray tube (CRT), a liquid crystal display (LCD), an organic LED (OLED) display, or an "electronic ink" display. In some embodiments, presentation interface 50 includes one or more display devices. In addition, or alternatively, presentation interface 50 includes an audio output device (not shown), for example, without limitation, an audio adapter or a speaker (not shown).

In some embodiments, controller 112 includes a user input interface 54. In the example embodiment, user input interface 54 is coupled to processor 48 and receives input from user 52. User input interface 54 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 50 and user input interface 54.

In the example embodiment, a communication interface 56 is coupled to processor 48 and is configured to be coupled in communication with one or more other devices, such as laser device 16, and to perform input and output operations with respect to such devices while performing as an input channel. For example, communication interface 56 may include, without limitation, a wired network adapter, a wireless network adapter, a mobile telecommunications adapter, a serial communication adapter, or a parallel communication adapter. Communication interface 56 may receive a data signal from or transmit a data signal to one or more remote devices. For example, in some embodiments, communication interface 56 of controller 112 may transmit/receive a data signal to/from actuator system 36.

Presentation interface 50 and communication interface 56 are both capable of providing information suitable for use with the methods described herein, such as, providing information to user 52 or processor 48. Accordingly, presentation interface 50 and communication interface 56 may be referred to as output devices. Similarly, user input interface 54 and communication interface 56 are capable of receiving information suitable for use with the methods described herein and may be referred to as input devices.

Figure 3:
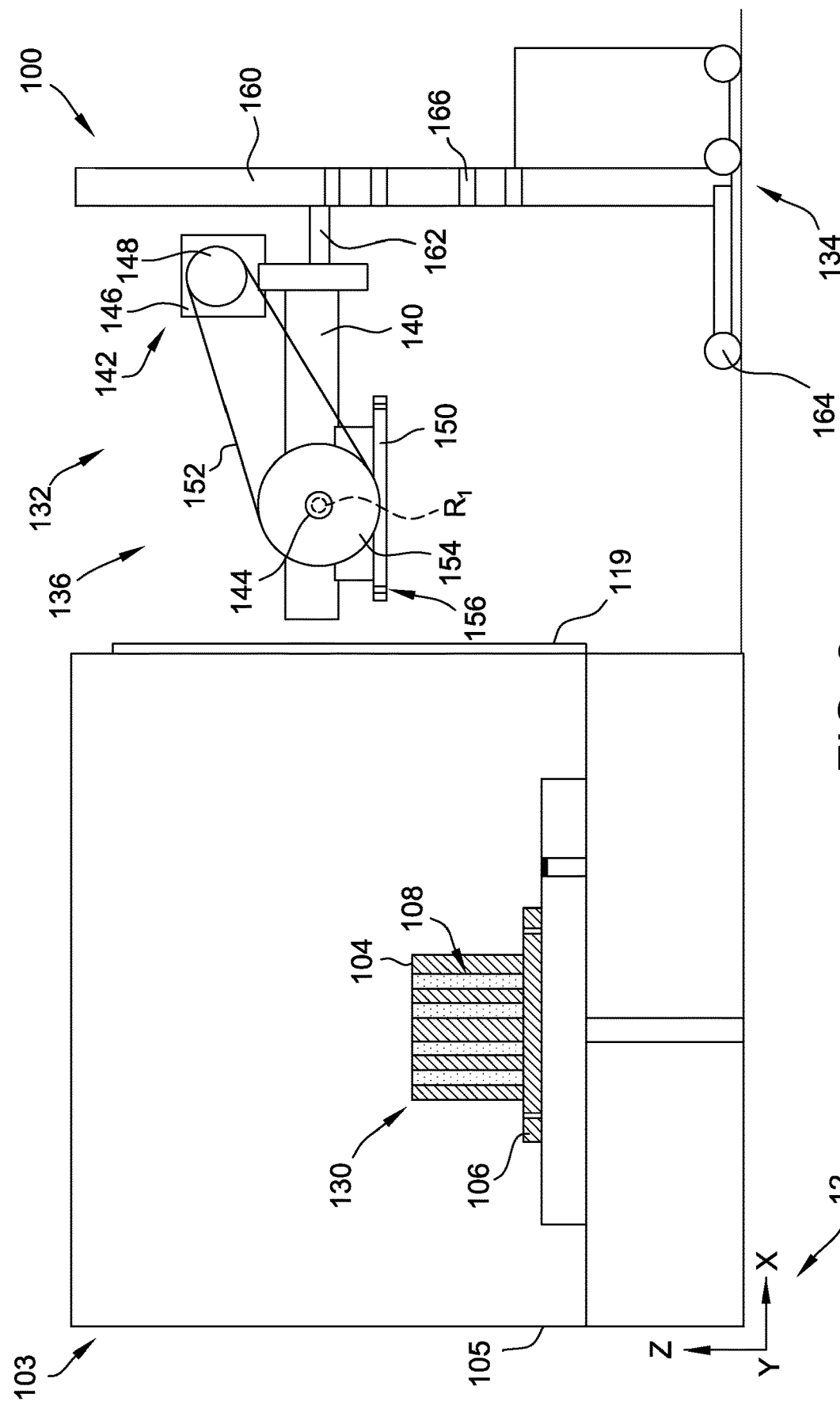
FIG. 3 is schematic view of an exemplary additive manufacturing system including the additive manufacturing unit shown in FIG. 1 and a component manipulator assembly.

FIG. 3 is a schematic view of an exemplary additive manufacturing system 100 that includes the additive manufacturing unit 103 shown in FIG. 1 and an exemplary component manipulator assembly 132. In the exemplary embodiment, component manipulator assembly 132 includes a lift assembly 134 and a rotator assembly 136 coupled to the lift assembly 134. Component manipulator assembly 132 engages and rotates component 104 within additive housing 105 to empty powder material 108 trapped within cavities 138 of component additive housing 105. In the exemplary illustrations, cavities 138 are shown proportionally enlarged in the figures for purposes of illustration only and it should be understood that cavities 138 are much smaller than the proportional size illustrated.

In the exemplary embodiment, rotator assembly 136 includes a frame 140, a drive assembly 142, a rotatable shaft 144 and a carriage 150. Drive assembly 142 is coupled to frame 140 and includes a motor and gearbox assembly 146 that couple to a driver sprocket 148 (alternatively referred to as a driver "pulley"). A belt 152 extends around driver sprocket 148 and a driven sprocket 154 of drive assembly 142. Driver sprocket 148 and driven sprocket 154 are each rotatably coupled to frame 140 for rotation relative thereto. Shaft 144 is operably coupled to driven sprocket 154 for rotation therewith about a rotational axis R1. In the illustration, rotation axis R1 extends into the page as shown in FIG. 3. Carriage 150 defines a plurality of openings 156 extending therethrough. Openings 156 are sized to receive a fastener 158 (shown in FIG. 7) for coupling carriage 150 to build plate 106. Carriage 150 is coupled to shaft 144 within frame 140 and rotates with shaft 144 about rotational axis R1, as described in greater detail below.

In the exemplary embodiment, lift assembly 134 moves rotator assembly 136 relative to additive housing 105. More specifically, in the exemplary embodiment, lift assembly 134 is a forklift that includes a mast 160, forks 162, and wheels 164. Forks 162 engage frame 140 of the rotator assembly 136 and support rotator assembly 136 thereon. Forks 162 are moveable vertically (i.e., in the Z-direction) along the mast 160 to facilitate raising/lowering rotator assembly 136 relative to additive housing 105. Lift assembly 134 is controllable by one or more operators to selectively move rotator assembly 136 into housing 105 for coupling carriage 150 to build plate 106, as described in greater detail below. Lift assembly 134 includes a plurality of position indicators 166 on mast 160 that facilitate guiding movement of forks 162 during operations. Although shown and described herein as a forklift, in other embodiments, lift assembly 134 may include any other lifting mechanism that is suitable to engage and manipulate component 104 as described herein. For example, and without limitation, in an alternative embodiment, lift assembly 134 may be a lift that is coupled to additive housing 105 and/or be provided within additive housing 105.

Rotator assembly 136, in the exemplary embodiment, is battery-powered and includes controls that are integrated into the electronic controls of lift assembly 134. As such, during operation, an operator at lift assembly 134 may control operation of both lift assembly 134 and rotator assembly 136 from an operator station of lift assembly 134. In other embodiments, rotator assembly 136, and more specifically motor 146 be powered by an external power source, such as a battery source (not shown) of lift assembly 134.

Figure 4:
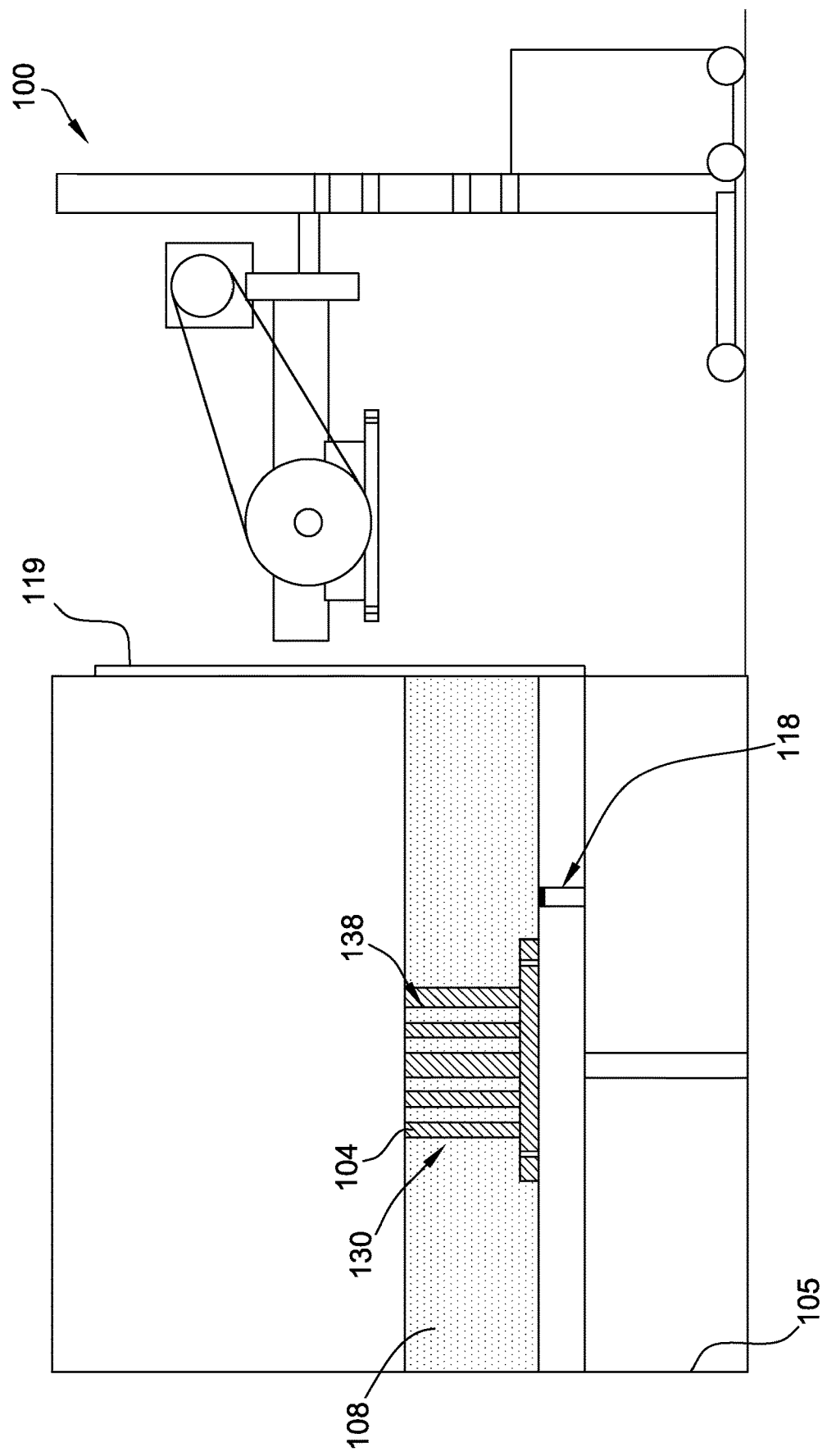
FIG. 4 is another schematic view of the additive manufacturing system shown in FIG. 3, showing an initial step in a process for manipulating a build assembly formed by the additive manufacturing unit.

FIGS. 4-9 illustrate exemplary successive steps of a process of manipulating build assembly 130 within additive housing 105 to empty powdered material 108 from cavities 138 within component 104. In particular FIG. 4 illustrates an initial step of the process wherein component 104 is fabricated and additive housing 105 is filled with powder material 108. Referring to FIG. 5, after fabrication has completed, powder material 108 is substantially drained from build area 120 by opening valve 122 and evacuating powder material 108 through powder drain 118 and to storage tank 126 (shown in FIG. 1).

As shown in FIG. 5, after powder material 108 is substantially drained from build area 120, some powder material 108 may be trapped within cavities 138 of component 104. Some of the remaining powdered material 108, such as powdered material 108 within threaded apertures 168 of build plate 106, may be removed by using a vacuum suction hose (not shown) or other similar devices. However, some powdered material 108 may remain trapped within portions of component 104, such as small cavities 138 for which it is not feasible and/or possible to access with a vacuum hose. Accordingly, to empty powder material 108 from such cavities 138, the present disclosure provides a method and apparatus for rotating build assembly 130 within additive housing 105, and more specifically, within build area 120, to enable such trapped powder material 108 to fall out of component 104 (i.e., be gravity fed) onto build platform 116 for evacuation and recovery of powder material 108 for reuse during subsequent build cycles.

Referring to FIG. 5, an exemplary second step of the process, is to lower build platform 116 within additive housing 105 after powder material 108 is drained from build area 120 and after access door 119 (shown in FIG. 4) is opened, to enable entry of rotator assembly 136 into build area 120 of additive housing 105. In other embodiments, build platform 116 may not be lowered prior to moving rotator assembly into additive housing 105.

Figure 6:
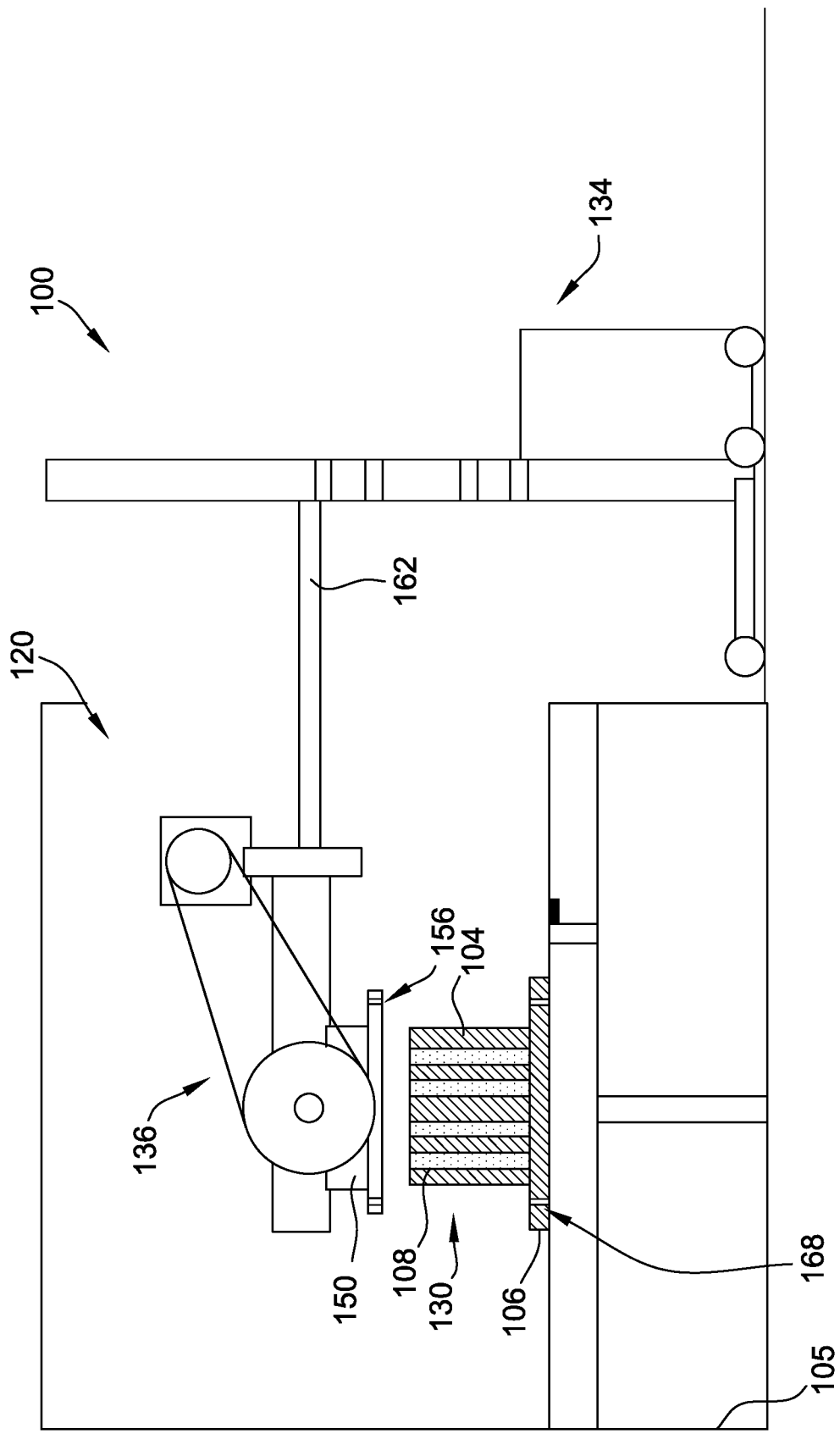
FIG. 6 is another schematic view of the additive manufacturing system shown in FIG. 3, showing a third step in the exemplary process.
Figure 7:
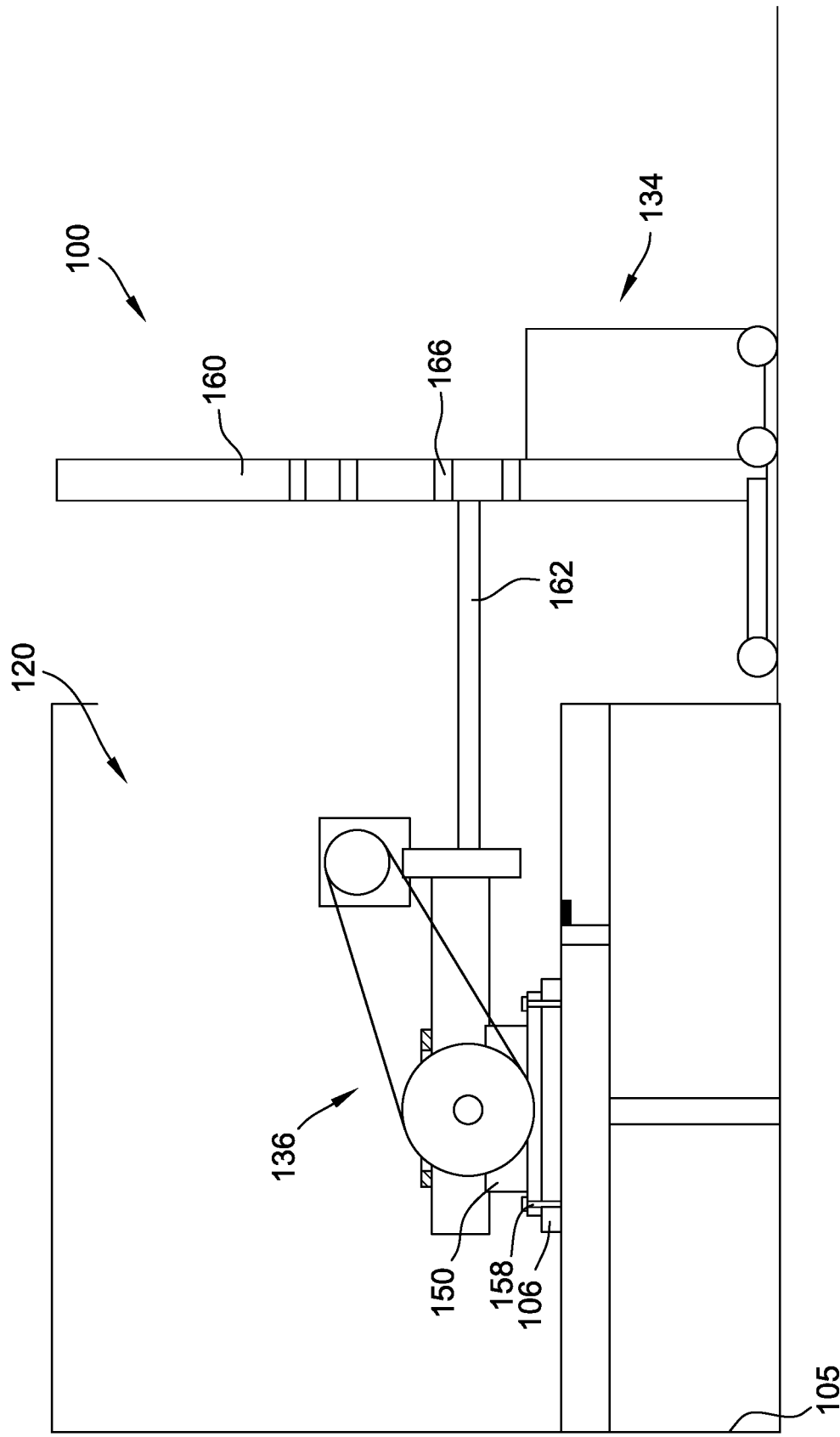
FIG. 7 is another schematic view of the additive manufacturing system shown in FIG. 3, showing a fourth step in the exemplary process.
Figure 8:
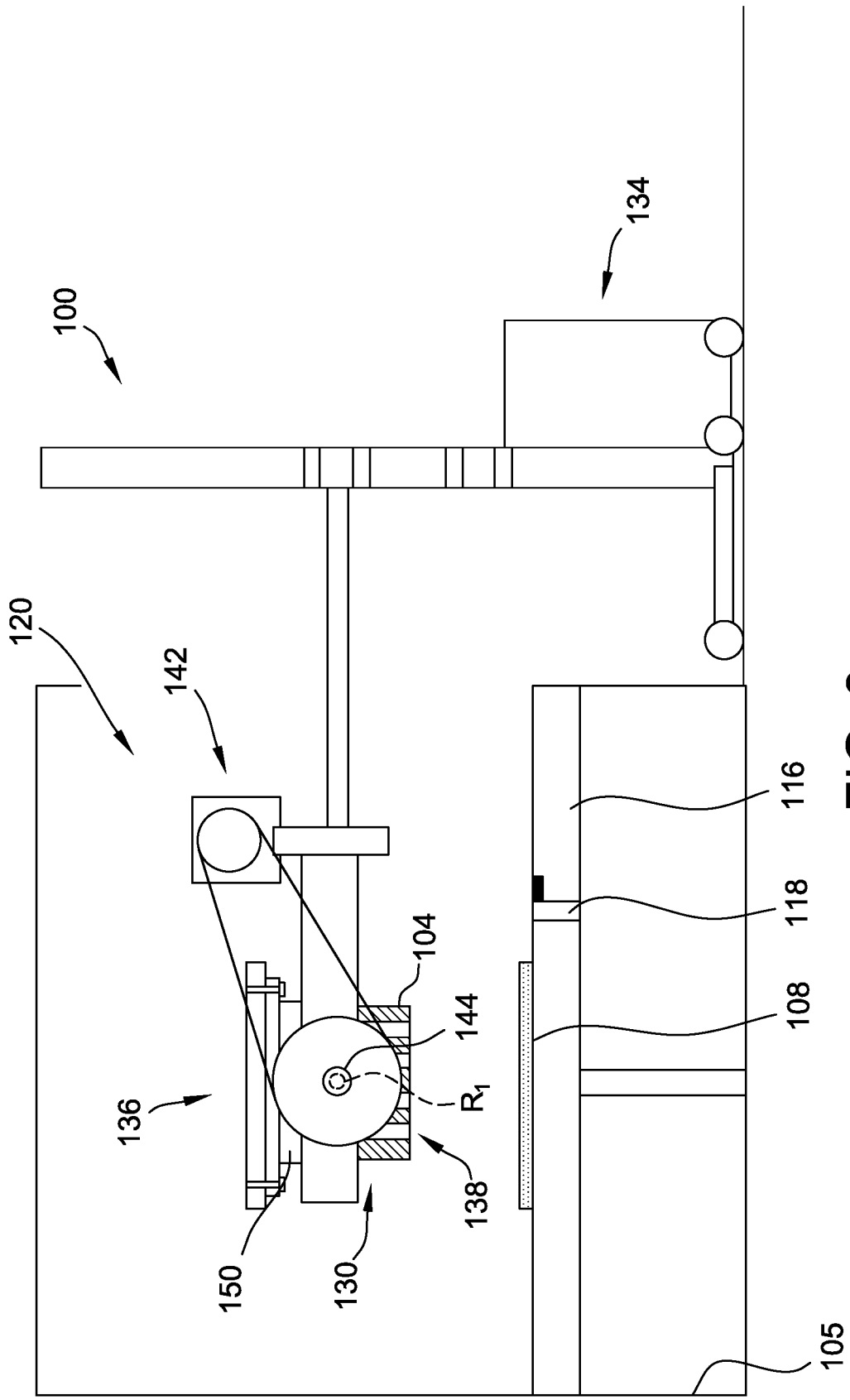
FIG. 8 is another schematic view of the additive manufacturing system shown in FIG. 3, showing a fourth step in the exemplary process.

Referring to FIG. 6, at an exemplary third step of the process, lift assembly 134 moves rotator assembly 136 into build area of additive housing 105 and positions rotator assembly 136 such that openings 156 in carriage 150 are aligned within corresponding threaded apertures 168 in build plate 106. One or more floor guides (not shown) may be mounted to the floor to guide an operator moving lift assembly 134 into the correct horizontal position such that openings 156 in carriage are aligned with threaded apertures 168 of build plate 106. In FIGS. 6-8, forks 162 are shown as elongated relative to FIGS. 3-5 for illustrative purposes only and are not elongated to move rotator assembly 136 into additive housing 105. In other embodiments, lift assembly 134 may include selectively extendable forks.

As shown in FIG. 7, lift assembly 134 then lowers forks 162 on mast 160 (e.g., using position indicators 166 on mast 160 as a guide) to lower rotator assembly 136 within build area 120. In particular, rotator assembly 136 is lowered within build area 120 such that carriage 150 is positioned on and contacts build plate 106. An operator then couples carriage 150 to build plate 106 by installing fasteners 158 through openings 156 (shown in FIG. 6) of carriage 150 and into threaded apertures 168 (shown in FIG. 6) on build plate 106. In other embodiments, other suitable coupling elements may be used to connect carriage 150 to build plate 106. For example, and without limitation, in some alternative embodiments, clamps (not shown) are used to coupled build plate 106 to carriage 150.

Referring to FIG. 8, at a fourth step of the example process, lift assembly 134 raises rotator assembly 136 and build assembly 130 within additive housing 105 and rotator assembly 136 rotates build assembly 130 around rotational axis R1 to empty powder material 108 from cavities 138. In the example embodiment, rotator assembly 136 is operable to rotate build assembly 130 in a full circle (i.e., 360 degrees) around rotational axis R1. As shown in FIG. 8, rotates build assembly 130 approximately 180 degrees about rotational axis R1, after build assembly 130 is lifted within build area 120, such that build assembly 130 is inverted within build area 120.

In the example embodiment, the rotational axis $R_1$ is generally perpendicular to the build direction or Z-direction, according to the coordinate system 12 shown in FIG. 1. Accordingly, as rotator assembly 136 rotates build assembly 130 and carriage 150, build assembly 130 and carriage 150 are each flipped or "inverted." With build assembly 130 inverted, powder material 108 is allowed to fall out of cavities 138 of component 104 and onto build platform 116 for recovery through powder drain 118. Moreover, drive assembly 142 of rotator assembly 136 may be selectively controlled to oscillate build assembly 130 such as by quickly oscillating between a clockwise and counter-clockwise direction, to loosed any trapped powder material 108 trapped within cavities 138. Additionally or alternatively, lift assembly 134 may oscillate build assembly 130 in the X-direction or Z-direction to loosen any powder material 108 in cavities 138. In other embodiments, rotator assembly 136 further includes a reciprocating apparatus (not shown) that is operable to quickly oscillate build assembly 130 on rotator assembly 136 for loosening powder material 108 within cavities 138. For example, in some embodiments, a linear actuator (not shown) may be operably coupled to shaft 144 for reciprocating carriage 150 and build assembly 130 in the horizontal direction horizontally (i.e., into the page in FIG. 8).

After powder material 108 is allowed to fallout of build assembly 130, rotator assembly 136 may optionally rotate build assembly 130 back to its initial orientation (e.g., as shown in FIGS. 1-7) and lift assembly 134 carries build assembly 130 out of additive housing 105. Component 104 may then be separated from build plate 106 (e.g., using laser cutting or other suitable techniques) for reuse of build plate 106 in subsequent build cycles.

Figure 9:
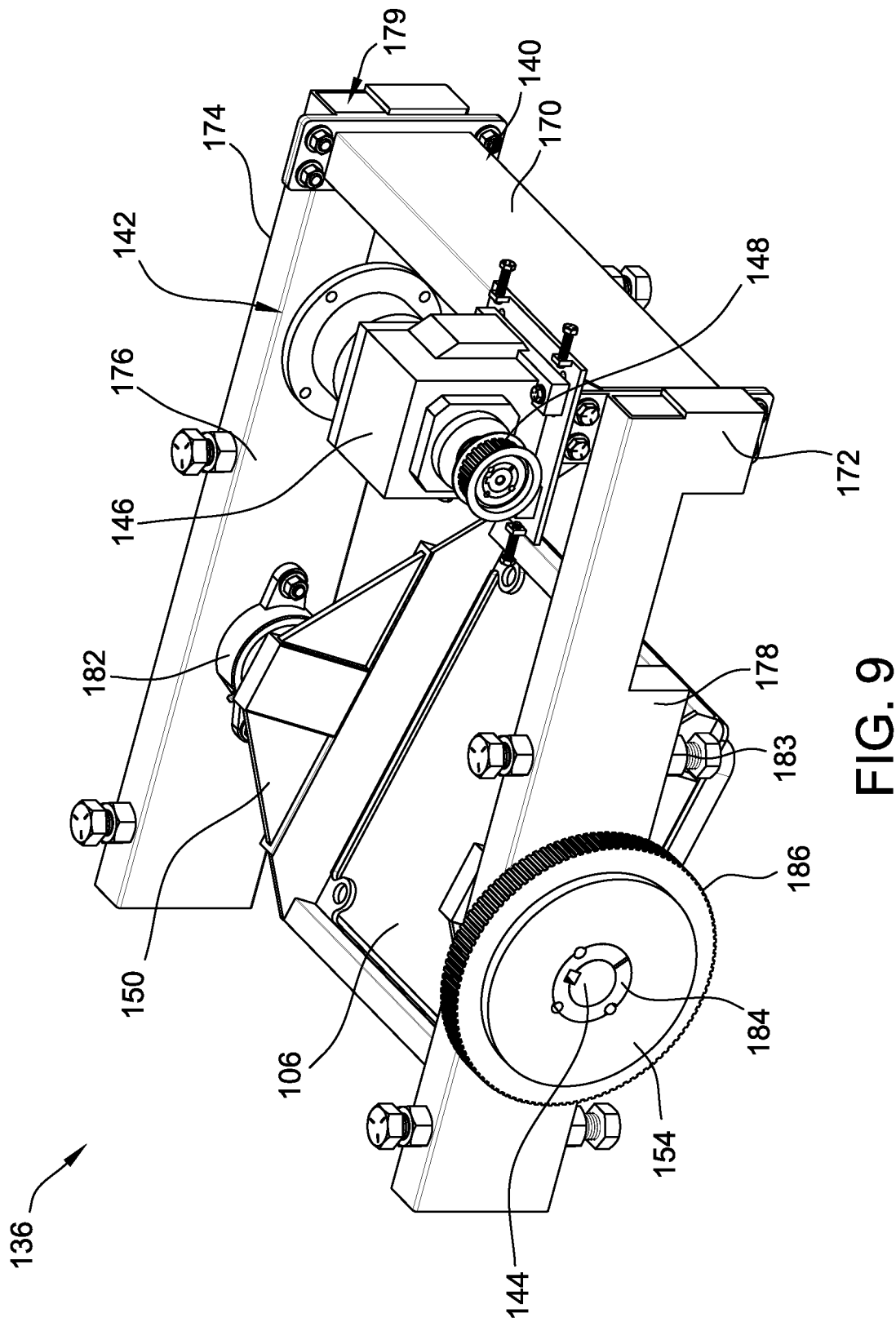
FIG. 9 is a perspective schematic view of an exemplary rotator assembly for use with the component manipulator assembly shown in FIG. 3, and illustrating an exemplary carriage of the rotator assembly in a first orientation.
Figure 10:
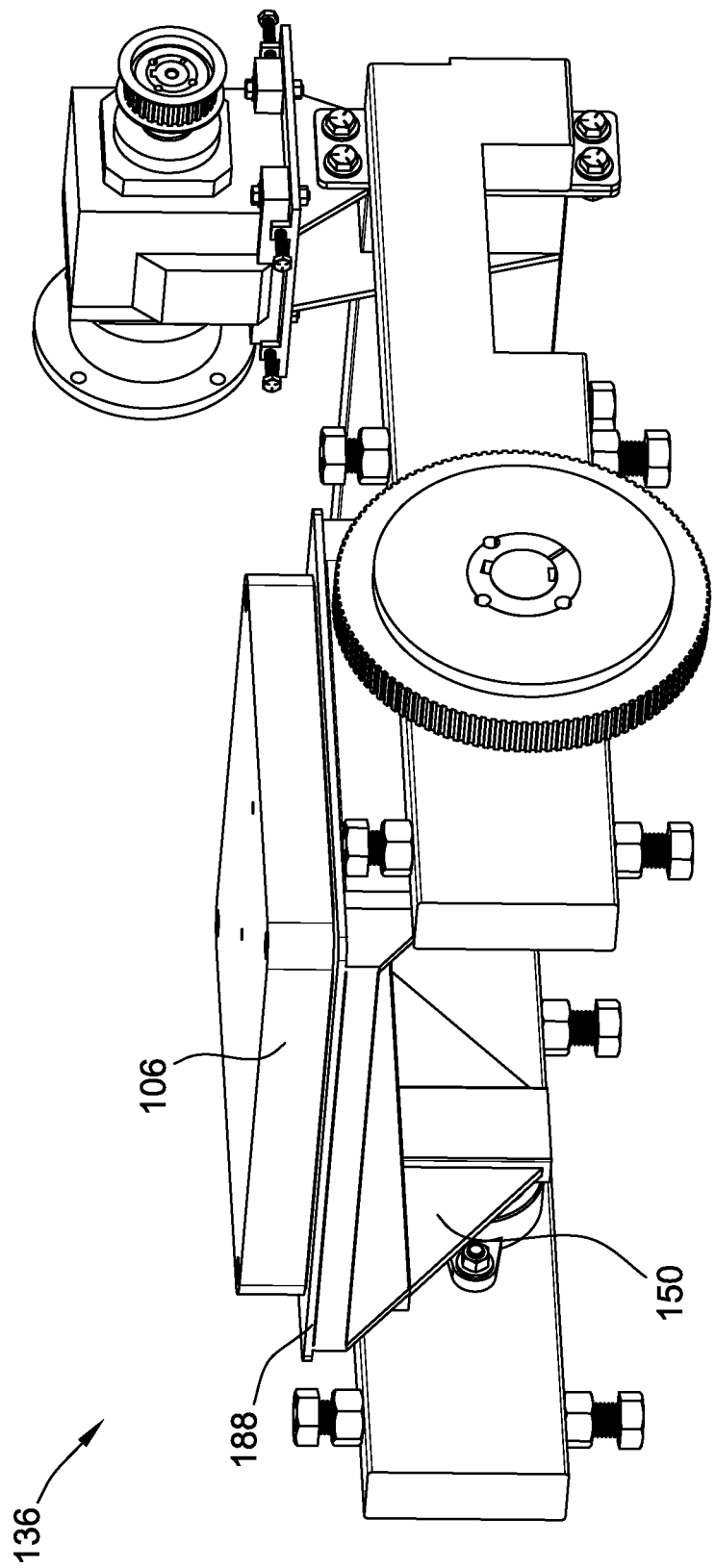
FIG. 10 is a perspective schematic view of the rotator assembly shown in FIG. 9, illustrating the carriage in a second orientation.
Figure 11:
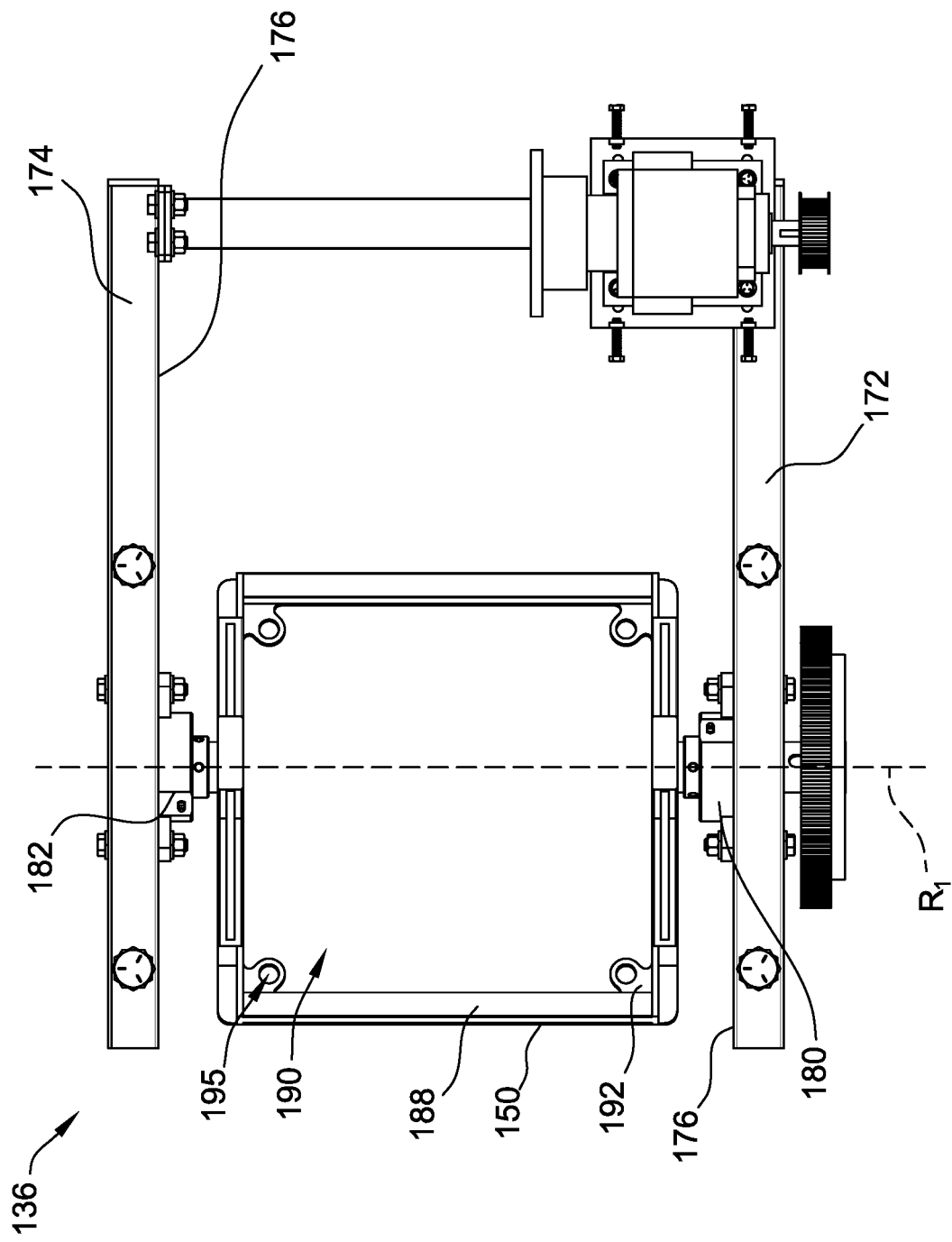
FIG. 11 is a top schematic view of the rotator assembly shown in FIG. 9.

FIG. 9 is a perspective view of the rotator assembly 136 shown in FIG. 3 including a build plate 106 rotated in a first orientation. FIG. 10 is a perspective view of the rotator assembly 136 and build plate 106 shown in FIG. 9, showing build plate 106 rotated to a second orientation. FIG. 11 is a top view of the rotator assembly 136 shown in FIG. 9. In FIGS. 9-11, gearbox and motor assembly 146 is shown without motor.

Referring to FIG. 9, in the example embodiment, rotator assembly 136 includes frame 140, drive assembly 142 coupled to frame 140. Frame 140 includes a connecting arm 170 and first and second frame arms 172, 174 coupled to connecting arm 170 and each extending from connecting arm 170 substantially in parallel to one another and transversely to connecting arm 170. First and second arms 172, 174 each include an inner surface 176 facing carriage 150 and an opposed outer surface 178. First and second frame arms 172, 174 are further each at least partially hollow and each define a channel 179 for receiving forks 162 (shown in FIG. 3) of lift assembly 134 therein. A plurality of fasteners 183 extend into channels 179 and may engage forks 162 to secure forks 162 in position within frame arms 172, 174. Frame arms 172, 174 each extend a sufficient length from connecting arm 170 such that, during operation, carriage 150 may be rotated a full 360 degrees without frame 140 or other components of rotator assembly 136 obstructing rotation of carriage 150.

Drive assembly 142 includes a motor and gearbox 146 (only gearbox is shown in FIGS. 9-11), driver sprocket 148, driven sprocket 154. A pair of bearings 180, 182 (both shown in FIG. 11) are coupled to inner surfaces 178 of first and second arms 172, 174, respectively (e.g., via fasteners in the example embodiment). Bearings 180, 182 rotatably support carriage 150 on frame arms 172, 174. Drive assembly 142 further includes a coupling sleeve 184 which concentrically receives a first shaft 144 of carriage 150 therein. Sleeve 184 is also received within and engages driver sprocket 148. In other embodiments, drive assembly 142 does not include sleeve 184 and first shaft 144 is directly coupled to driven sprocket 154.

In the example embodiment, driver sprocket 148 and driven sprocket 154 each include teeth 186 defining circumferentially outer surfaces of sprockets 148, 154 which receive belt 152 (shown in FIG. 3). During operation, motor and gearbox 146 may be selectively controlled to drive rotation of driver sprocket 148, which drives rotation of driven sprocket 154 and first shaft 144 to rotate carriage 150 relative to frame 140.

Referring to FIG. 10, carriage 150 and build plate 106 are each shown as being rotated approximately 180 degrees from a lifting or "first" orientation (i.e., the orientation shown in FIG. 7) to a dumping or "second" orientation (i.e., the orientation shown in FIG. 8). In the second orientation build plate 106 is oriented downward with a base 188 of carriage 150 being positioned below build plate 106, to allow powder 108 to fall out of component 104 (shown in FIG. 8).

Referring to FIG. 11, in the example embodiment, first bearing 180 is coupled to inner surface 176 of first frame arm 172 and second bearing 182 is coupled to inner surface 176 of second frame arm 174. Carriage 150 extends between frame arms 172, 174 and includes a base 188 defining a central opening 190 therein. Carriage 150 further includes a plurality of fastening rings 192 that extend inward of the base 188 into the central opening 190. Fastening rings 192 each define an aperture 195 for receiving a fastener 158 therethrough for coupling carriage 150 to build plate 106 (e.g., as shown in FIG. 7). Fastening rings 192 and/or fasteners 158 are alternatively referred to herein as coupling features and/or coupling mechanisms, which facilitate coupling build assembly 130 to carriage 150.

Figure 12:
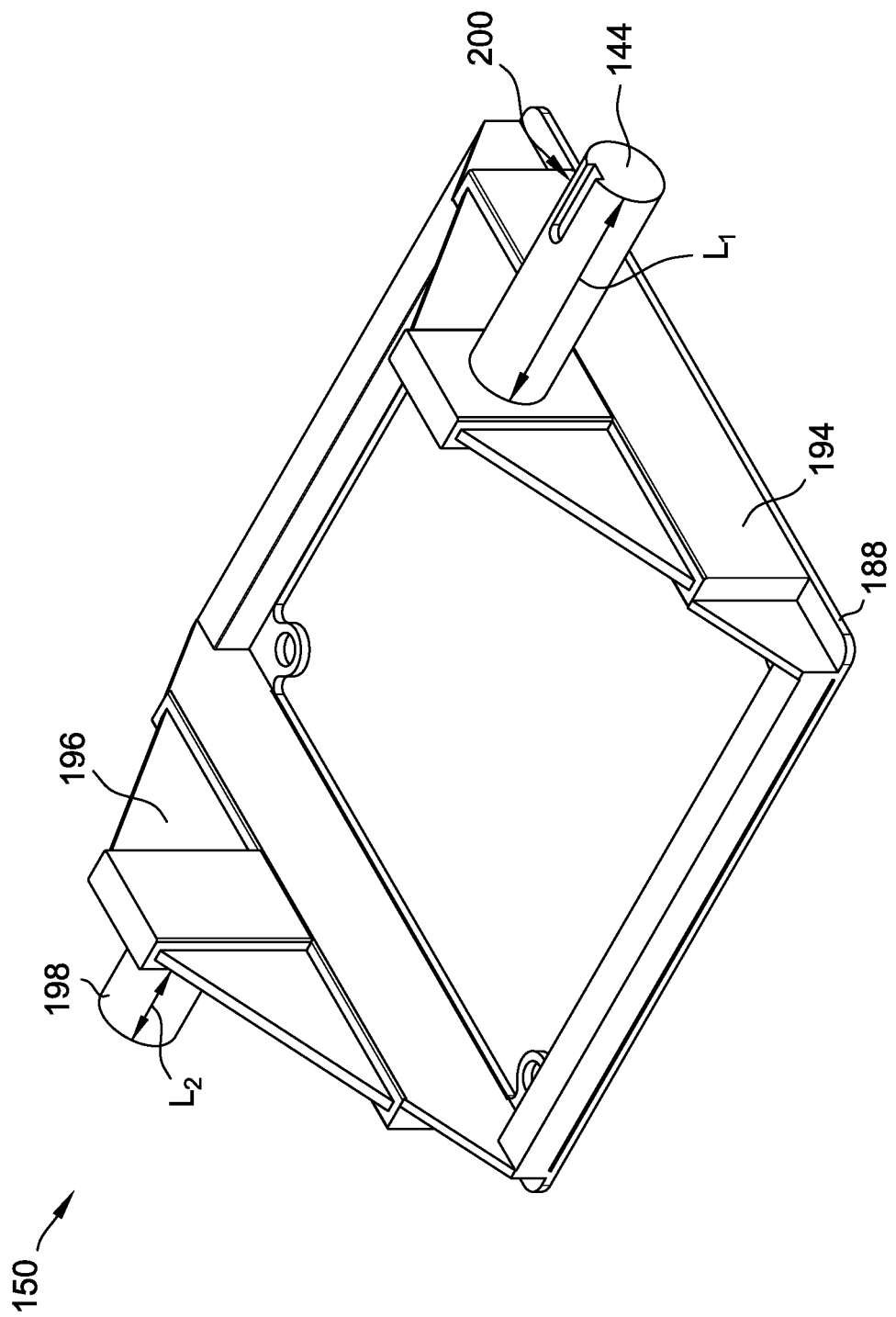
FIG. 12 is a perspective schematic view of the carriage shown in FIG. 9.

Referring to FIG. 12, carriage 150 further includes a first sidewall 194 and a second sidewall 196 that each have a generally triangular shape and extend transversely outward (i.e., upward when carriage 150 is in the first orientation shown in FIG. 7) from base 188. First shaft 144 extends outward from first sidewall 194 and a second shaft 198 extends outward from second sidewall 196. In other embodiments, carriage 150 includes any number of shafts that enable carriage 150 to function as described herein. For example, in some embodiments, carriage 150 includes a single shaft (not shown) that extends through first and second sidewalls 194, 196 and into first and second bearings 180, 182 (shown in FIG. 11). In other embodiments, shafts 144, 198 may be provided in a plurality of sections (not shown) such as a first section extending outward from first sidewall 194, a second section extending outward from second sidewall 196, and a third section extending between first and second sidewalls 194, 196. In the example embodiment, as shown in FIG. 11, rotational axis R1 extends along first and second shafts 144, 198 and through first and second frame arms 172, 174.

Referring to FIG. 12, in the example embodiment, first shaft 144 defines a notch 200, which receives a coupling key (not shown) for coupling first shaft 144 to sleeve 184 (shown in FIG. 9). For example, sleeve 184 includes a corresponding notch (not shown) that, when aligned with notch 200 in first shaft 144, defines an opening that is sized and shaped to receive the coupling key. In other embodiments, first shaft 144 is coupled to sleeve 184 and/or driven sprocket 154 in any manner that enables carriage 150 to function as described herein. In the example embodiment, first shaft 144 has a first length $L_1$ extending from first sidewall 194 that is greater than a second length $L2$ of second shaft 198 extending from second sidewall 196. In other embodiments, first and second shafts 144, 198 may have any suitable length.

Figure 13:
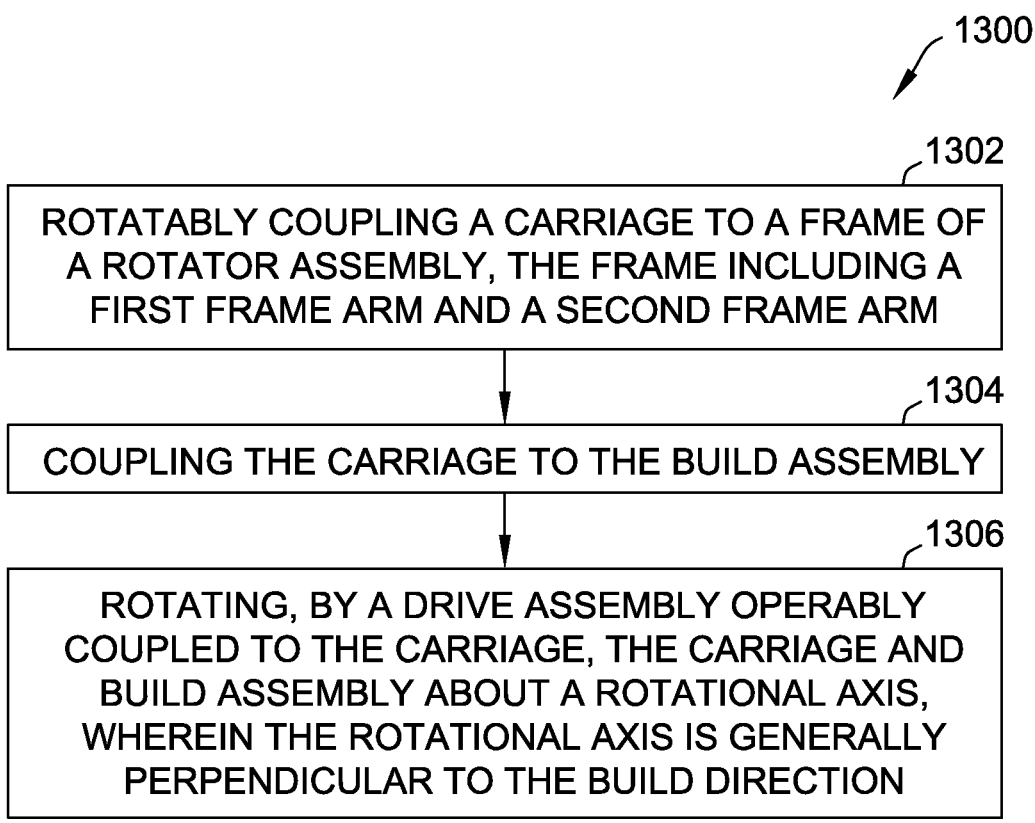
FIG. 13 is a flow diagram of an exemplary method of rotating a build assembly within a housing of an additive manufacturing unit.

FIG. 13 shows a flow diagram for an example method 1300 of rotating a build assembly within a housing of an additive manufacturing unit, where the additive manufacturing unit is configured to additively form the build assembly by processing a powder material along a build direction. In a first step, the method 1300 includes rotatably coupling 1302 a carriage to a frame of a rotator assembly, the frame including a first frame arm and a second frame arm. In a second step, the method 1300 includes coupling 1304 the carriage to the build assembly. In a third step, the method 1300 further includes rotating 1306, by a drive assembly operably coupled to the carriage, the carriage and build assembly about a rotational axis, wherein the rotational axis is generally perpendicular to the build direction.

The above described embodiments relate to an additive manufacturing system that includes an additive manufacturing unit and a rotator assembly. The additive manufacturing unit includes a housing for additively processing a powder material along a build direction into a build assembly. The rotator assembly includes a frame including a first frame arm and a second frame arm. The rotator assembly further includes a carriage rotatably coupled to the frame arms that includes at least one coupling feature for coupling the carriage to the build assembly. The carriage further includes a drive assembly operably coupled to the carriage for rotating the carriage about a rotational axis that is parallel to the build direction.

In the example embodiment, the rotator assembly may be used to rotate or flip the build assembly within the additive manufacturing unit to release powder material that is otherwise trapped in the build component. The rotator assembly may be selectively introduced into and coupled to the build assembly, such as by a lift assembly described in the example embodiment. The rotator assembly may flip the build assembly above a drain of the additive unit, such that powder that is released from the unit during the flipping may be collected within the unit and reused during subsequent build cycles.

Additionally, some example technical effects of the systems and methods described herein includes at least one of: (a) improved functionality additive systems to fabricate components having complex cavity structures; (b) reduced waste of powder material during builds by recovering the powder mater; (c) improved quality of build components by removing powder trapped within cavities that are otherwise difficult to access; and (d) reduced need for expensive auxiliary powder removal equipment to remove powder within build components.

Further aspects of the present disclosure are provided by the subject matter of the following clauses:

1. An additive manufacturing system comprising: an additive manufacturing unit comprising a housing for additively processing a powder material along a build direction into a build assembly; and a rotator assembly for rotating said build assembly within said housing, said rotator assembly comprising: a frame comprising a first frame arm and a second frame arm; a carriage rotatably coupled to said first frame arm and to said second frame arm, said carriage comprising at least one coupling mechanism for removably coupling said carriage to said build assembly; and a drive assembly coupled to said carriage for selectively rotating said carriage about a rotational axis, wherein the rotational axis is generally perpendicular to the build direction.
2. The additive manufacturing system according to any preceding clause, wherein said rotational axis extends through the first frame arm and the second frame arm.
3. The additive manufacturing system according to any preceding clause, wherein said carriage comprises a shaft rotatably coupled to said first frame arm, said shaft extending through said first frame arm to a sprocket of said drive assembly.
4. The additive manufacturing system according to any preceding clause further comprising a lift assembly coupled to said rotator assembly, said lift assembly being operable to move said rotator assembly within said housing in a direction that is generally parallel to said build direction.
5. The additive manufacturing system according to any preceding clause, wherein said lift assembly comprises a fork and wherein at least one of said first frame arm and second frame arm defines a channel sized to receive said fork therein.
6. The additive manufacturing system according to any preceding clause, wherein said lift assembly is operable to raise said carriage and said build assembly within said housing off a build platform to a raised position, and wherein said rotator assembly is operable to rotate said carriage and build assembly about the rotational axis within said housing while in the raised position to release powder material from one or more cavities defined within said build assembly.
7. The additive manufacturing system according to any preceding clause, wherein said rotator assembly is operable to rotate said carriage and said build assembly approximately 360 degrees about the rotational axis, when said build assembly and carriage are in the raised position.
8. The additive manufacturing system according to any preceding clause, wherein said build assembly comprises a build plate and a component additively manufactured onto said component, said build plate configured to be reused in subsequent build cycles.
9. The additive manufacturing system according to any preceding clause, wherein said carriage is releasably coupleable to said build plate.
10. The additive manufacturing system according to any preceding clause, wherein said drive assembly comprises a motor, a first sprocket operably coupled to said motor, a second sprocket coupled to said carriage, and a belt extending around said first sprocket and said second sprocket.
11. A rotator assembly for rotating a build assembly within an additive manufacturing unit, the build assembly being at least partially additively manufactured by processing a powder material along a build direction, said rotator assembly comprising: a frame comprising a first frame arm and a second frame arm; a carriage rotatably coupled to said first frame arm and said second frame arm, said carriage including at least one coupling feature for coupling said carriage to the build assembly; and a drive assembly operably coupled to said carriage for rotating said carriage about a rotational axis, wherein the rotational axis is generally perpendicular to the build direction.
12. The rotator assembly according to any preceding clause, wherein said rotational axis extends through the first frame arm and the second frame arm.
13. The rotator assembly according to any preceding clause, wherein said carriage comprises a shaft rotatably coupled to said first frame arm, said shaft extending through said first frame arm to a sprocket of said drive assembly.
14. The rotator assembly according to any preceding clause further comprising a lift assembly coupled to said rotator assembly, said lift assembly being operable to move said rotator assembly within said unit in a direction that is generally parallel to said build direction.
15. The rotator assembly according to any preceding clause, wherein said lift assembly is operable to raise said carriage and said build assembly within the additive manufacturing unit off a build platform to a raised position, and wherein said rotator assembly is operable to rotate said carriage and build assembly 360 degrees about the rotational axis within the unit while in the raised position to release powder material from one or more cavities defined within the build assembly.

16. A method of rotating a build assembly within a housing of an additive manufacturing unit, the additive manufacturing unit configured to additively form the build assembly by processing a powder material along a build direction, said method comprising: rotatably coupling a carriage to a frame of a rotator assembly, the frame including a first frame arm and a second frame arm; coupling the carriage to the build assembly; and rotating, by a drive assembly operably coupled to the carriage, the carriage and build assembly about a rotational axis, wherein the rotational axis is generally perpendicular to the build direction.

17. The method according to any preceding clause, wherein the rotational axis extends through the first frame arm and the second frame arm.

18. The method according to any preceding clause further comprising: coupling a lift assembly to the rotator assembly; and raising, by the lift assembly and prior to said rotating, said carriage and build assembly off of a build platform of the additive manufacturing unit.

19. The method according to any preceding clause, wherein said rotating comprising rotating the carriage and build assembly 360 degrees about the rotational axis.

20. The method according to any preceding clause further comprising: moving, by the lift assembly and after said rotating, the build assembly out of the housing of the additive manufacturing unit; and collecting powder released into the housing from the build assembly during said rotating.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system for additively manufacturing a build assembly including a component on a build plate, said system comprising:
   an additive manufacturing unit comprising a housing for additively processing a powder material along a build direction into said build assembly; and
   a rotator assembly for rotating said build assembly within said housing, said rotator assembly comprising:
      a frame comprising a first frame arm and a second frame arm;
      a carriage rotatably coupled to said first frame arm and to said second frame arm;
      a fastener configured to removably attach said carriage to said build plate; and
      a drive assembly coupled to said carriage for selectively rotating said carriage, said build plate, and said component about a rotational axis, wherein the rotational axis is perpendicular to the build direction.

2. The additive manufacturing system of claim 1, wherein said rotational axis extends through the first frame arm and the second frame arm.

3. The additive manufacturing system of claim 1, wherein said carriage comprises a shaft rotatably coupled to said first frame arm, said shaft extending through said first frame arm to a sprocket of said drive assembly.

4. The additive manufacturing system of claim 1 further comprising a lift assembly coupled to said rotator assembly, said lift assembly being operable to move said rotator assembly within said housing in a direction that is generally parallel to said build direction.

5. The additive manufacturing system of claim 4, wherein said lift assembly comprises a fork and wherein at least one of said first frame arm and second frame arm defines a channel sized to receive said fork therein.

6. The additive manufacturing system of claim 4, wherein said lift assembly is operable to raise said carriage and said build assembly within said housing off a build platform to a raised position, and wherein said rotator assembly is operable to rotate said carriage and build assembly about the rotational axis within said housing while in the raised position to release powder material from one or more cavities defined within said build assembly.

7. The additive manufacturing system of claim 6, wherein said rotator assembly is operable to rotate said carriage and said build assembly approximately 360 degrees about the rotational axis, when said build assembly and carriage are in the raised position.

8. The additive manufacturing system of claim 1, wherein said build plate is configured to be reused in subsequent build cycles.

9. The additive manufacturing system of claim 8, wherein said carriage is releasably coupleable to said build plate.

10. The additive manufacturing system of claim 1, wherein said drive assembly comprises a motor, a first sprocket operably coupled to said motor, a second sprocket coupled to said carriage, and a belt extending around said first sprocket and said second sprocket.

11. A rotator assembly for rotating a build assembly within an additive manufacturing unit, the build assembly comprising a build plate and a component additively manufactured onto said build plate by processing a powder material along a build direction, said rotator assembly comprising:
   a frame comprising a first frame arm and a second frame arm;
   a carriage rotatably coupled to said first frame arm and said second frame arm;
   a fastener configured to removably attach said carriage to said build plate; and
   a drive assembly operably coupled to said carriage for rotating said carriage, said build plate, and said component, about a rotational axis, wherein the rotational axis is perpendicular to the build direction.

12. The rotator assembly of claim 11, wherein said rotational axis extends through the first frame arm and the second frame arm.

13. The rotator assembly of claim 11, wherein said carriage comprises a shaft rotatably coupled to said first frame arm, said shaft extending through said first frame arm to a sprocket of said drive assembly.

14. The rotator assembly of claim 11 further comprising a lift assembly coupled to said rotator assembly, said lift assembly being operable to move said rotator assembly within the unit in a direction that is generally parallel to said build direction.

15. The rotator assembly of claim 14, wherein said lift assembly is operable to raise said carriage and said build assembly within the additive manufacturing unit off a build platform to a raised position, and wherein said rotator assembly is operable to rotate said carriage and build assembly 360 degrees about the rotational axis within the unit while in the raised position to release powder material from one or more cavities defined within the build assembly.

16. A method of rotating a build assembly within a housing of an additive manufacturing unit, the additive manufacturing unit configured to additively form the build assembly by processing a powder material along a build direction, the build assembly including a component on a build plate, said method comprising:
   rotatably coupling a carriage to a frame of a rotator assembly, the frame including a first frame arm and a second frame arm,
   the rotator assembly further including a fastener configured to removably attach the carriage to the build plate,
   and a drive assembly coupled to the carriage for selectively rotating the carriage, the build plate, and the component about a rotational axis;
   coupling the carriage to the build assembly; and
   rotating, by the drive assembly, the carriage, the build plate, and the component about a rotational axis, wherein the rotational axis is generally perpendicular to the build direction.

17. The method of claim 16, wherein the rotational axis extends through the first frame arm and the second frame arm.

18. The method of claim 16 further comprising:
   coupling a lift assembly to the rotator assembly; and
   raising, by the lift assembly and prior to said rotating, said carriage and build assembly off of a build platform of the additive manufacturing unit.

19. The method of claim 18, wherein said rotating comprising rotating the carriage and build assembly 360 degrees about the rotational axis.

20. The method of claim 18 further comprising:
   moving, by the lift assembly and after said rotating, the build assembly out of the housing of the additive manufacturing unit; and
   collecting powder released into the housing from the build assembly during said rotating.

* * * * *